United States Patent
Fujino et al.

(10) Patent No.: US 9,900,100 B2
(45) Date of Patent: Feb. 20, 2018

(54) OPTICAL LINE TERMINAL, COMMUNICATION CONTROL METHOD, AND COMMUNICATION CONTROL PROGRAM

(71) Applicant: SUMITOMO ELECTRIC INDUSTRIES, LTD., Osaka-shi, Osaka (JP)

(72) Inventors: Kenjiro Fujino, Osaka (JP); Hideyuki Tanaka, Osaka (JP); Kazutaka Kawamoto, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/129,035

(22) PCT Filed: Apr. 13, 2015

(86) PCT No.: PCT/JP2015/061352
§ 371 (c)(1),
(2) Date: Sep. 26, 2016

(87) PCT Pub. No.: WO2015/166791
PCT Pub. Date: Nov. 5, 2015

(65) Prior Publication Data
US 2017/0117965 A1    Apr. 27, 2017

(30) Foreign Application Priority Data
Apr. 30, 2014   (JP) ................. 2014-093931

(51) Int. Cl.
*H04B 10/272* (2013.01)
*H04B 10/03* (2013.01)
*H04Q 11/00* (2006.01)

(52) U.S. Cl.
CPC .......... *H04B 10/272* (2013.01); *H04B 10/03* (2013.01); *H04Q 11/0067* (2013.01); *H04Q 2213/053* (2013.01)

(58) Field of Classification Search
CPC ...................................... H04B 10/03
See application file for complete search history.

(56) References Cited

U.S. PATENT DOCUMENTS

| | | | |
|---|---|---|---|
| 2014/0023366 A1* | 1/2014 | Zang | H04L 41/04 398/58 |
| 2014/0348505 A1* | 11/2014 | Bernstein | H04B 10/2575 398/58 |

FOREIGN PATENT DOCUMENTS

| | | |
|---|---|---|
| JP | 2004-201059 A | 7/2004 |
| JP | 2006-262129 A | 9/2006 |

(Continued)

OTHER PUBLICATIONS

IEEE Standrads 802.3ah (registered trademark)—2004, Chapter 64, pp. 421-476.

*Primary Examiner* — David Payne
*Assistant Examiner* — Casey Kretzer
(74) *Attorney, Agent, or Firm* — Drinker Biddle & Reath LLP

(57) ABSTRACT

The present invention relates to an optical line terminal capable of communicating with a plurality of optical network units. The optical line terminal includes an obtaining unit that performs an obtaining process that obtains configuration information for each of the optical network units from another apparatus; and a configuring unit that performs a configuration process that transmits a part or all of the configuration information obtained by the obtaining unit to the each of the optical network units. The obtaining unit performs the obtaining process for each of the optical (Continued)

network units in an order determined according to a priority of the each of the optical network units.

9 Claims, 7 Drawing Sheets

(56) References Cited

FOREIGN PATENT DOCUMENTS

| | | | |
|---|---|---|---|
| JP | 2007-067601 A | | 3/2007 |
| JP | 2009-188519 A | | 8/2009 |
| JP | 2012-124687 A | | 6/2012 |
| JP | 2012124687 A | * | 6/2012 |
| WO | WO 2012/139453 A1 | * | 10/2012 ............ H04L 12/24 |

* cited by examiner

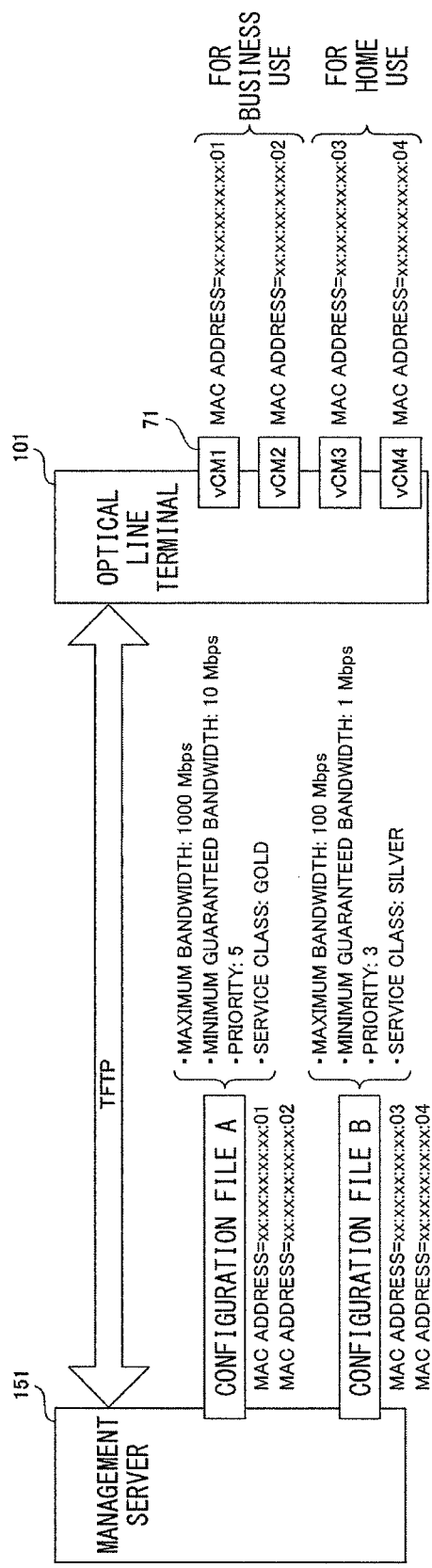

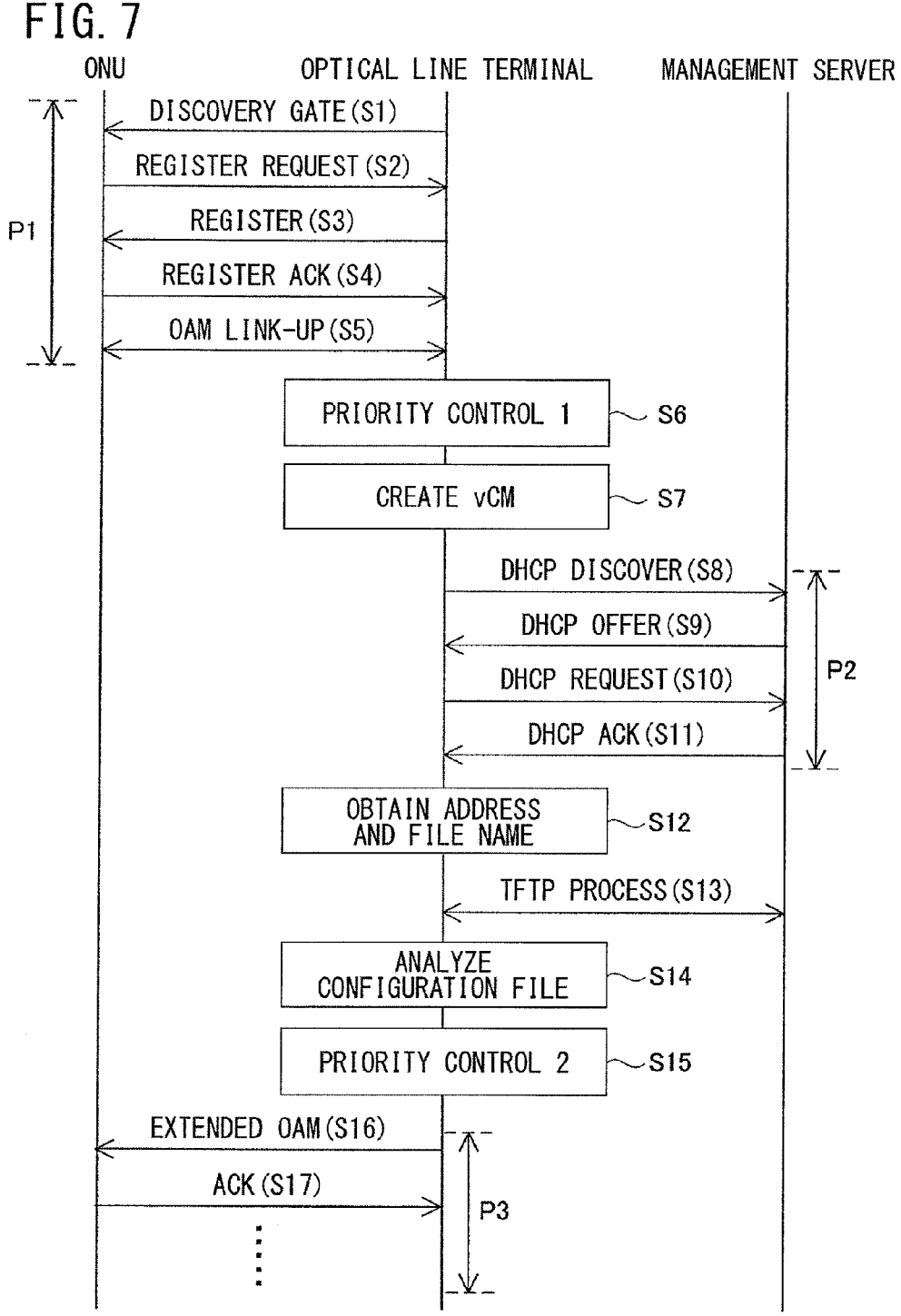

OPTICAL LINE TERMINAL, COMMUNICATION CONTROL METHOD, AND COMMUNICATION CONTROL PROGRAM

TECHNICAL FIELD

The present invention relates to an optical line terminal, a communication control method, and a communication control program, and more particularly to an optical line terminal that obtains configuration information for optical network units from another apparatus, and a communication control method and a communication control program for the optical line terminal.

BACKGROUND ART

In recent years, the Internet has been widely used, and a user can access various information on websites operated at different locations around the world, and get the information. Accordingly, apparatuses that can perform broadband access such as ADSL (Asymmetric Digital Subscriber Line) and FTTH (Fiber To The Home) have also rapidly begun to be widely used.

IEEE Std 802.3ah (registered trademark)—2004 (Non-Patent Literature 1) discloses one scheme for a passive optical network (PON) which is media sharing communication where a plurality of optical network units (ONUs) perform data transmission with an optical line terminal (OLT) by sharing an optical communication line. Specifically, there are specified an EPON (Ethernet (registered trademark) PON) where all information including user information that passes through a PON and control information for managing and operating the PON is communicated in Ethernet (registered trademark) frame format, and an EPON access control protocol (MPCP (Multi-Point Control Protocol)) and an OAM (Operations Administration and Maintenance) protocol. By exchanging MPCP frames between the optical line terminal and an optical network unit, the subscription and unsubscription of the optical network unit, upstream access multiplex control, and the like, are performed. In addition, Non-Patent Literature 1 describes a registration method for a new optical network unit, a REPORT indicating a bandwidth allocation request, and a GATE indicating a transmission instruction which are performed by MPCP messages.

CITATION LIST

Patent Literature

Non-Patent Literature 1: IEEE Std 802.3ah (registered trademark)—2004

SUMMARY OF INVENTION

Technical Problem

After an ONU links up, i.e., establishes a communication connection with an optical line terminal, through a discovery process, etc., the optical line terminal transmits various types of configuration information used by the ONU for communication, etc., to the ONU. For example, in an optical communication system where the configuration information is saved in a management server, etc., which is different than the optical line terminal, the optical line terminal needs to obtain the configuration information for the ONU from the management server using TFTP (Trivial File Transfer Protocol), etc., and then provide the configuration information to the ONU using extended OAM, etc.

Hence, the length of time from when the ONU links up until communication traffic actually starts flowing between the optical line terminal and the ONU becomes long. In addition, if the number of ONUs that link up at the same timing increases, then the length of time further becomes longer, and accordingly, it becomes difficult to satisfy users' demands for an early start of communication.

The invention is made to solve the above-described problem, and an object of the invention is to provide an optical line terminal, a communication control method, and a communication control program that are capable of providing communication services that appropriately satisfy demands for an early start of communication in an optical communication system where the optical line terminal and a plurality of optical network units can communicate with each other.

Solution to Problem (1) To solve the above-described problem, an optical line terminal according to one aspect of the invention is an optical line terminal capable of communicating with a plurality of optical network units, and includes an obtaining unit that performs an obtaining process that obtains configuration information for each of the optical network units from another apparatus; and a configuring unit that performs a configuration process that transmits a part or all of the configuration information obtained by the obtaining unit to the each of the optical network units, and the obtaining unit performs the obtaining process for each of the optical network units in an order determined according to a priority of the each of the optical network units.

(6) In addition, an optical line terminal according to another aspect of the invention is an optical line terminal capable of communicating with a plurality of optical network units, and includes an obtaining unit that performs an obtaining process that obtains configuration information for each of the optical network units from another apparatus; and a configuring unit that performs a configuration process that transmits a part or all of the configuration information obtained by the obtaining unit to the each of the optical network units, and the configuring unit performs the configuration process for the each of the optical network units in an order determined according to a priority of the each of the optical network units.

(7) To solve the above-described problem, a communication control method according to one aspect of the invention is a communication control method for a communication system including an optical line terminal capable of communicating with a plurality of optical network units, and includes the steps of; performing an obtaining process that obtains configuration information for each of the optical network units from another apparatus; and performing a configuration process that transmits a part or all of the obtained configuration information to the each of the optical network units, and in the step of performing the obtaining process, the obtaining process for each of the optical network units is performed in an order determined according to a priority of the each of the optical network units.

(8) In addition, a communication control method according to another aspect of the invention is a communication control method for a communication system including an optical line terminal capable of communicating with a plurality of optical network units, and includes the steps of:

performing an obtaining process that obtains configuration information for each of the optical network units from another apparatus; and performing a configuration process that transmits a part or all of the obtained configuration information to the each of the optical network units, and in the step of performing the configuration process, the configuration process for the each of the optical network units is performed in an order determined according to a priority of the each of the optical network units.

(9) To solve the above-described problem, a communication control program according to one aspect of the invention is a communication control program used by a communication system including an optical line terminal capable of communicating with a plurality of optical network units, and causes a computer to perform the steps of: performing an obtaining process that obtains configuration information for each of the optical network units from another apparatus; and performing a configuration process that transmits a part or all of the obtained configuration information to the each of the optical network units, and in the step of performing the obtaining process, the obtaining process for each of the optical network units is performed in an order determined according to a priority of the each of the optical network units.

(10) In addition, a communication control program according to another aspect of the invention is a communication control program used by a communication system including an optical line terminal capable of communicating with a plurality of optical network units, and causes a computer to perform the steps of: performing an obtaining process that obtains configuration information for each of the optical network units from another apparatus; and performing a configuration process that transmits a part or all of the obtained configuration information to the each of the optical network units, and in the step of performing the configuration process, the configuration process for the each of the optical network units is performed in an order determined according to a priority of the each of the optical network units.

The present invention can be implemented not only as an optical line terminal including such characteristic processing units, but also as a method having such characteristic processes as steps or as a program for causing a computer to perform such steps. In addition, the present invention can be implemented as a semiconductor integrated circuit that implements a part or all of an optical line terminal, or can be implemented as a system including an optical line terminal.

Advantageous Effects of Invention

According to the present invention, communication services that appropriately satisfy demands for an early start of communication can be provided in an optical communication system where an optical line terminal and a plurality of optical network units can communicate with each other.

BRIEF DESCRIPTION OF DRAWINGS

FIG. 6 is a diagram showing still another example of a method of determining priorities of ONUs by the optical line terminal according to the embodiment of the present invention.

FIG. 7 is a diagram showing an example of a sequence from when an ONU links up until communication traffic starts flowing in the PON system according to the embodiment of the present invention.

DESCRIPTION OF EMBODIMENTS

Figure 1:
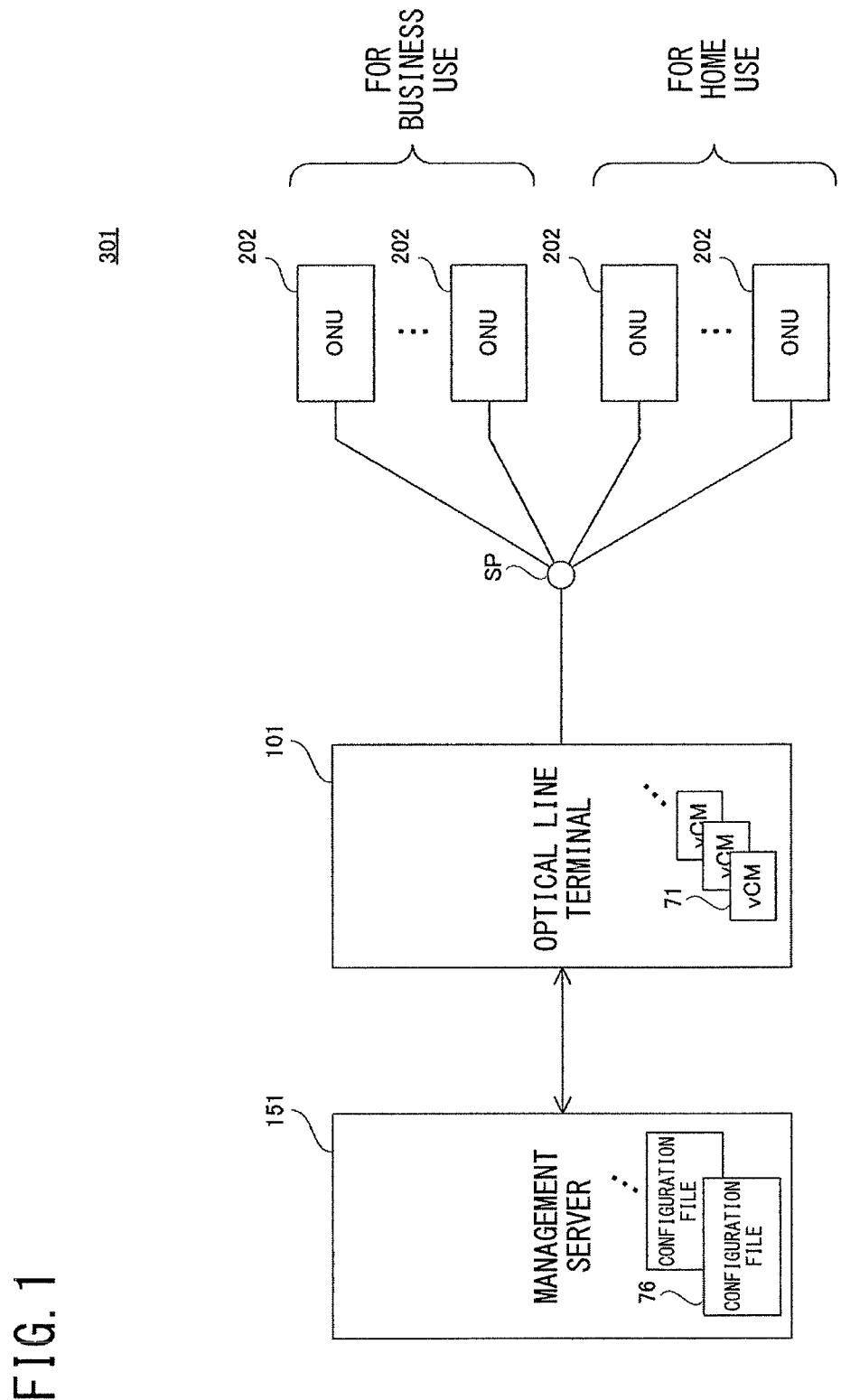
FIG. 1 is a diagram showing a configuration of a PON system according to an embodiment of the present invention.

First, the content of an embodiment of the present invention is listed and described.

(1) An optical line terminal according to an embodiment of the present invention is an optical line terminal capable of communicating with a plurality of optical network units, and includes an obtaining unit that performs an obtaining process that obtains configuration information for each of the optical network units from another apparatus; and a configuring unit that performs a configuration process that transmits a part or all of the configuration information obtained by the obtaining unit to the each of the optical network units, and the obtaining unit performs the obtaining process for each of the optical network units in an order determined according to a priority of the each of the optical network units.

By such a configuration, a time-consuming obtaining process of configuration information for an optical network unit from another apparatus can be performed in an order determined according to the priority of each optical network unit. By this, even when a large number of optical network units link up at the same timing, delay in the start of use of communication services by users of optical network units with high priorities can be suppressed, enabling to satisfy users' demands for an early start of communication. Therefore, the optical line terminal according to the embodiment of the present invention can provide communication services that appropriately satisfy demands for an early start of communication in an optical communication system where the optical line terminal and a plurality of optical network units can communicate with each other.

(2) It is preferred that the configuring unit perform the configuration process for the each of the optical network units in an order determined according to the priority of the each of the optical network units.

By such a configuration, a time-consuming transmission process of configuration information from the optical line terminal to an optical network unit can be performed in an order determined according to the priority of each optical network unit. By this, even when a large number of optical network units link up at the same timing, delay in the start of use of communication services by users of optical network units with high priorities can be further suppressed, enabling to more securely satisfy users' demands for an early start of communication.

(3) It is preferred that the optical line terminal further include a connection processing unit that performs a connection process for establishing a communication connection between each of the optical network units and the optical line terminal, and the obtaining unit perform the obtaining process for the each of the optical network units whose connection process is completed, and a number of optical network units whose obtaining processes can be performed in parallel by the optical line terminal be smaller than a number of optical network units whose connection processes can be performed in parallel by the optical line terminal.

By such a configuration, in an optical communication system where, while a large number of optical network units can link up in parallel, processes for allowing users of the optical network units to start the use of communication services, which are performed after the link-up, can only be performed in parallel for a small number of optical network units, the start of use of the communication services can be more effectively accelerated.

(4) It is preferred that the optical line terminal further include a memory unit that stores priority information indicating the priority of the each of the optical network units, and the obtaining unit perform, using the priority information, the obtaining process for the each of the optical network units in an order determined according to the priority of the each of the optical network units.

By such a configuration, a priority of each optical network unit is obtained by a simple configuration and process, and various types of processes can be performed in an order determined according to the priority.

(5) It is preferred that the configuring unit determine a priority of each of the optical network units based on the configuration information, and perform the configuration process for the each of the optical network units in an order determined according to the priority.

By such a configuration, priorities can be appropriately set according to a difference in the content of communication services between the optical network units, etc.

(6) An optical line terminal according to the embodiment of the present invention is an optical line terminal capable of communicating with a plurality of optical network units, and includes an obtaining unit that performs an obtaining process that obtains configuration information for each of the optical network units from another apparatus; and a configuring unit that performs a configuration process that transmits a part or all of the configuration information obtained by the obtaining unit to the each of the optical network units, and the configuring unit performs the configuration process for the each of the optical network units in an order determined according to a priority of the each of the optical network units.

By such a configuration, a time-consuming transmission process of configuration information from the optical line terminal to an optical network unit can be performed in an order determined according to the priority of each optical network unit. By this, even when a large number of optical network units link up at the same timing, delay in the start of use of communication services by users of optical network units with high priorities can be suppressed, enabling to satisfy users' demands for an early start of communication. Therefore, the optical line terminal according to the embodiment of the present invention can provide communication services that appropriately satisfy demands for an early start of communication in an optical communication system where the optical line terminal and a plurality of optical network units can communicate with each other.

(7) A communication control method according to the embodiment of the present invention is a communication control method for a communication system including an optical line terminal capable of communicating with a plurality of optical network units, and includes the steps of: performing an obtaining process that obtains configuration information for each of the optical network units from another apparatus; and performing a configuration process that transmits a part or all of the obtained configuration information to the each of the optical network units, and in the step of performing the obtaining process, the obtaining process for each of the optical network units is performed in an order determined according to a priority of the each of the optical network units.

By such a configuration, a time-consuming obtaining process of configuration information for an optical network unit from another apparatus can be performed in an order determined according to the priority of each optical network unit. By this, even when a large number of optical network units link up at the same timing, delay in the start of use of communication services by users of optical network units with high priorities can be suppressed, enabling to satisfy users' demands for an early start of communication. Therefore, the communication control method according to the embodiment of the present invention can provide communication services that appropriately satisfy demands for an early start of communication in an optical communication system where an optical line terminal and a plurality of optical network units can communicate with each other.

(8) A communication control method according to the embodiment of the present invention is a communication control method for a communication system including an optical line terminal capable of communicating with a plurality of optical network units, and includes the steps of; performing an obtaining process that obtains configuration information for each of the optical network units from another apparatus; and performing a configuration process that transmits a part or all of the obtained configuration information to the each of the optical network units, and in the step of performing the configuration process, the configuration process for the each of the optical network units is performed in an order determined according to a priority of the each of the optical network units.

By such a configuration, a time-consuming transmission process of configuration information from the optical line terminal to an optical network unit can be performed in an order determined according to the priority of each optical network unit. By this, even when a large number of optical network units link up at the same timing, delay in the start of use of communication services by users of optical network units with high priorities can be suppressed, enabling to satisfy users' demands for an early start of communication. Therefore, the communication control method according to the embodiment of the present invention can provide communication services that appropriately satisfy demands for an early start of communication in an optical communication system where an optical line terminal and a plurality of optical network units can communicate with each other.

(9) A communication control program according to the embodiment of the present invention is a communication control program used by a communication system including an optical line terminal capable of communicating with a plurality of optical network units, and causes a computer to perform the steps of; performing an obtaining process that obtains configuration information for each of the optical network units from another apparatus; and performing a configuration process that transmits a part or all of the obtained configuration information to the each of the optical network units, and in the step of performing the obtaining process, the obtaining process for each of the optical network units is performed in an order determined according to a priority of the each of the optical network units.

By such a configuration, a time-consuming obtaining process of configuration information for an optical network unit from another apparatus can be performed in an order determined according to the priority of each optical network unit. By this, even when a large number of optical network units link up at the same timing, delay in the start of use of communication services by users of optical network units with high priorities can be suppressed, enabling to satisfy users' demands for an early start of communication. Therefore, the communication control program according to the embodiment of the present invention can provide communication services that appropriately satisfy demands for an early start of communication in an optical communication system where an optical line terminal and a plurality of optical network units can communicate with each other.

(10) A communication control program according to the embodiment of the present invention is a communication control program used by a communication system including an optical line terminal capable of communicating with a plurality of optical network units, and causes a computer to perform the steps of: performing an obtaining process that obtains configuration information for each of the optical network units from another apparatus; and performing a configuration process that transmits a part or all of the obtained configuration information to the each of the optical network units, and in the step of performing the configuration process, the configuration process for the each of the optical network units is performed in an order determined according to a priority of the each of the optical network units.

By such a configuration, a time-consuming transmission process of configuration information from the optical line terminal to an optical network unit can be performed in an order determined according to the priority of each optical network unit. By this, even when a large number of optical network units link up at the same timing, delay in the start of use of communication services by users of optical network units with high priorities can be suppressed, enabling to satisfy users' demands for an early start of communication. Therefore, the communication control program according to the embodiment of the present invention can provide communication services that appropriately satisfy demands for an early start of communication in an optical communication system where an optical line terminal and a plurality of optical network units can communicate with each other.

The embodiment of the present invention will be described below using the drawings. Note that the same or corresponding portions in the drawings are denoted by the same reference signs and description thereof is not repeated. Note also that at least a part of the embodiment described below may be arbitrarily combined.

FIG. 1 is a diagram showing a configuration of a PON system according to the embodiment of the present invention.

Referring to FIG. 1, a PON system 301 includes an optical line terminal 101, a management server 151, a plurality of ONUs 202, and a splitter SP.

One or a plurality of ONUs 202 for business use and the optical line terminal 101 are connected to each other through the splitter SP and an optical fiber, and perform transmission and reception of optical signals with each other. One or a plurality of ONUs 202 for home use and the optical line terminal 101 are connected to each other through the splitter SP and the optical fiber, and perform transmission and reception of optical signals with each other.

In the PON system 301, optical signals from the ONUs 202 to the optical line terminal 101 are time-division multiplexed.

In addition, the PON system 301 operates, for example, in DPoE (Data Over Cable Service Interface Specification Provisioning of EPON) mode.

The management server 151 holds, for example, a plurality of types of configuration files 76. Each configuration file 76 includes various types of configuration information which is used by a corresponding ONU for communication, etc. Specifically, for example, the configuration file 76 includes the maximum bandwidth, minimum guaranteed bandwidth, priority, service class, etc., of the ONU 202. The priority is a priority of data to be communicated, and the service class is the content of contract such as business use and home use.

After an ONU 202 links up, i.e., establishes a communication connection with the optical line terminal 101, through a discovery process, etc., the optical line terminal 101 obtains a corresponding configuration file 76 from the management server 151. Then, the optical line terminal 101, for example, provides a part or all of information in the obtained configuration file 76 to the ONU 202 using extended OAM, etc., and sets the part or all of the information on itself.

More specifically, the optical line terminal 101 creates a vCM (Virtual Cable Modem) 71 for each linked-up ONU 202.

The vCM 71 is, for example, a table showing the MAC address, number of LLIDs, LLID, IP address, and state of the ONU 202.

In DPoE mode, an IP address is provided to the vCM. Specifically, the management server 151 provides an IP address to a vCM provided for a linked-up ONU 202, according to DHCP. The optical line terminal 101 saves the IP address of the vCM provided from the management server 151 such that the IP address is associated with the corresponding ONU 202.

The optical line terminal 101 obtains, using the IP address, a configuration file 76 from the management server 151 according to, for example, TFTP (Trivial File Transfer Protocol).

When the management server 151 inquires about a state of an ONU 202, the management server 151 specifies the ONU 202 to the optical line terminal 101, using an IP address.

The optical line terminal 101 identifies, using the vCMs 71, an ONU 202 from the specified IP address and obtains state information from the ONU 202 using a corresponding MAC address, LLID, etc.

Here, in DPoE mode, as described above, there are required provision of an IP address to a linked-up ONU 202, obtainment of a configuration file 76, and configuration for the ONU 202. Hence, the length of time from when the ONU 202 links up until communication traffic actually starts flowing between the optical line terminal and the ONU 202 becomes long.

For example, there is a possibility that up to 4096 ONUs 202 may be connected to the optical line terminal 101. Hence, when a large number of ONUs 202 link up at the same timing upon recovery from a power failure, etc., the above-described length of time further becomes longer. Since a link-up of each ONU 202 is performed, for example, randomly, there is a possibility that a breach of contract may occur in services for business use with high demands for communication quality.

Hence, the PON system according to the embodiment of the present invention solves the above-described problem by the following configuration and operation.

Figure 2:
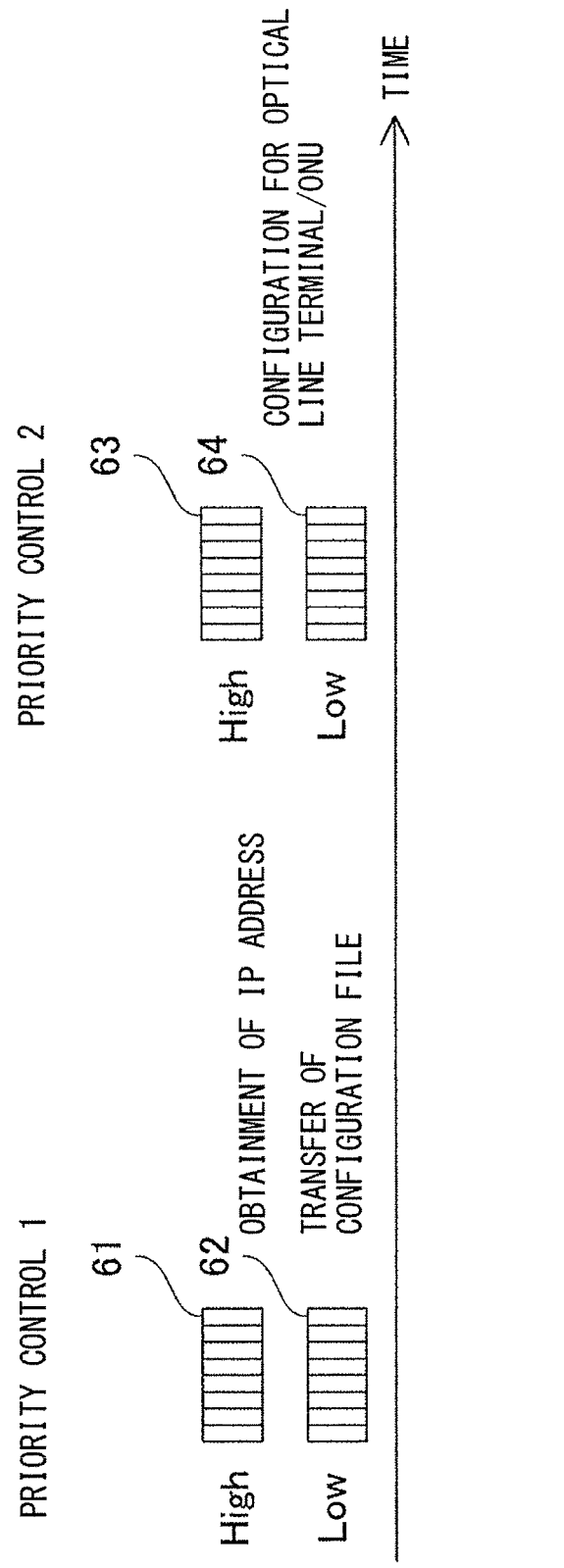
FIG. 2 is a diagram conceptually showing various types of priority control in the PON system according to the embodiment of the present invention.

FIG. 2 is a diagram conceptually showing various types of priority control in the PON system according to the embodiment of the present invention.

Referring to FIG. 2, the PON system 301 includes queues 61 to 64. The PON system 301 performs, using the queues 61 and 62, priority control 1 for the processes of obtaining IP addresses of the ONUs 202 and transferring the configuration files 76. In addition, the PON system 301 performs, using the queues 63 and 64, priority control 2 for configuration processes for the optical line terminal 101 and the ONUs 202 which use the configuration files 76. Note that the PON system 301 is not limited to being configured to perform both of the priority control 1 and the priority control 2 and may be configured to perform either one.

More specifically, the optical line terminal 101 in the PON system 301 provides priorities to linked-up ONUs 202. Then, in the priority control 1, the optical line terminal 101 stores processes for ONUs 202 with high priorities in the queue 61 and stores processes for ONUs 202 with low priorities in the queue 62, and performs the processes in the queue 61 on a priority basis.

In addition, in the priority control 2, the optical line terminal 101 stores processes for ONUs 202 with high priorities in the queue 63 and stores processes for ONUs 202 with low priorities in the queue 64, and performs the processes in the queue 63 on a priority basis.

For example, even when, with an ONU 202 for home use being linked up, an ONU 202 for business use links up later on, the optical line terminal 101 determines priorities such that a process for the ONU 202 for business use is performed first. Then, the optical line terminal 101 performs various types of processes in decreasing order of priority. By this, the time required for the ONUs 202 for business use to start communication traffic can be reduced.

Note that the optical line terminal 101 is not limited to being configured to use two values, high and low, as the priorities of the ONUs 202, and may be configured to use three or more positions in order.

In addition, the applications of the ONUs 202 are not limited to two types, business use and home use, and there may be three or more types. For example, there may be an ONU 202 for mobile backhaul, i.e., for an optical line that connects a mobile base station to an apparatus on the upper side. The ONU 202 for mobile backhaul has a higher priority compared to an ONU 202 for business use which is installed in an office.

Figure 3:
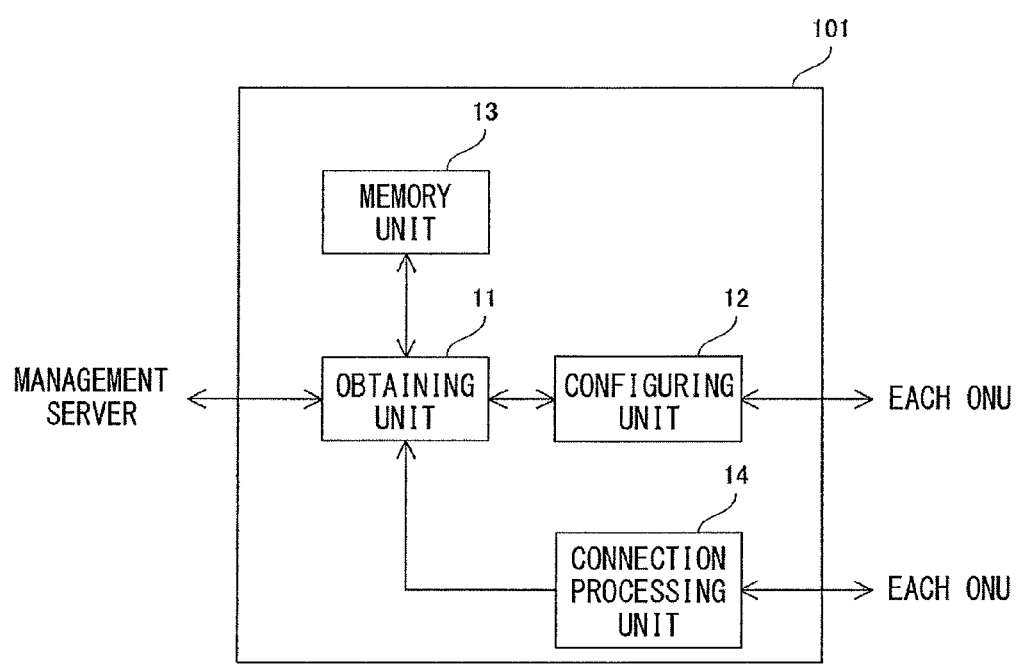
FIG. 3 is a diagram showing a configuration of an optical line terminal in the PON system according to the embodiment of the present invention.

FIG. 3 is a diagram showing a configuration of the optical line terminal in the PON system according to the embodiment of the present invention.

Referring to FIG. 3, the optical line terminal 101 includes an obtaining unit 11, a configuring unit 12, a memory unit 13, and a connection processing unit 14.

The obtaining unit 11 performs an obtaining process that obtains a configuration file 76 including configuration information of an ONU 202 from the management server 151, i.e., a transfer process of the IP address and configuration file 76 of the ONU 202, such as that described above. The obtaining unit 11 performs an obtaining process for each ONU 202 in an order determined according to a priority of each ONU 202.

The connection processing unit 14 performs a connection process for establishing a communication connection between an ONU 202 and the optical line terminal 101. The obtaining unit 11 performs an obtaining process for the ONU 202 whose connection process is completed.

The memory unit 13 stores priority information indicating the priority of each ONU 202. The obtaining unit 11 performs, for example, using the priority information stored in the memory unit 13, an obtaining process for each ONU 202 in an order determined according to the priority of each ONU 202.

The configuring unit 12 performs a configuration process that transmits a part or all of the configuration information obtained by the obtaining unit 11 to the ONU 202. The configuring unit 12 performs the configuration process for each ONU 202 in an order determined according to the priority of each ONU 202.

In addition, for example, the configuring unit 12 determines a priority of each ONU 202 based on the configuration information obtained by the obtaining unit 11, and performs a configuration process for each ONU 202 in an order determined according to the priority.

Note that the configuring unit 12 may be configured to perform a configuration process for each ONU 202 in an order determined according to a priority of each ONU 202, by using the priority information stored in the memory unit 13.

Figure 4:
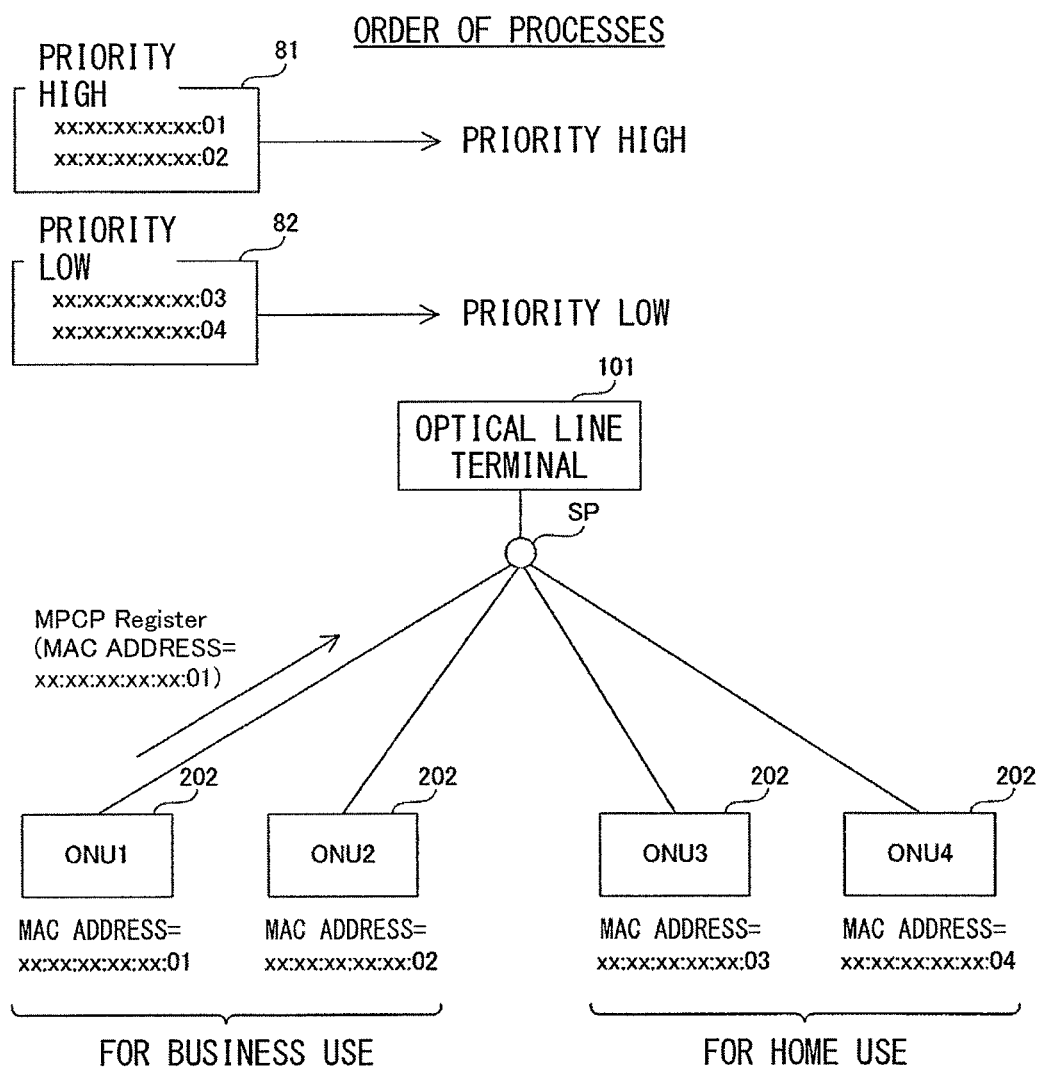
FIG. 4 is a diagram showing an example of a method of determining priorities of ONUs by the optical line terminal according to the embodiment of the present invention.

FIG. 4 is a diagram showing an example of a method of determining priorities of ONUs by the optical line terminal according to the embodiment of the present invention.

The optical line terminal 101 can determine a priority of an ONU 202 from a MAC address of the ONU 202.

Specifically, referring to FIG. 4, the optical line terminal 101 holds priority tables 81 and 82 in the memory unit 13.

In the priority table 81 are registered MAC addresses of ONUs 202 with high priorities. In the priority table 82 are registered MAC addresses of ONUs 202 with low priorities.

Here, when each ONU 202 links up, the ONU 202 notifies the optical line terminal 101 of its MAC address. Specifically, the optical line terminal 101 can obtain the MAC address of the ONU 202 by an MPCP REGISTER, an MPCP REGISTER ACK, a linkup notification event from the ONU 202 to the optical line terminal 101, and the like.

In this example, MAC addresses of an ONU1 and an ONU2 which are two ONUs 202 for business use are "xx:xx:xx:xx:xx:01" and "xx:xx:xx:xx:xx:02", respectively, and MAC addresses of an ONU3 and an ONU4 which are two ONUs 202 for home use are "xx:xx:xx:xx:xx:03" and "xx:xx:xx:xx:xx:04", respectively.

In addition, in the priority table 81 are registered the MAC addresses of the ONUs 202 for business use, and in the priority table 82 are registered the MAC addresses of the ONUs 202 for home use.

The optical line terminal 101 obtains a priority of an ONU 202 from an obtained MAC address of the ONU 202 by referring to the priority tables 81 and 82. The optical line terminal 101 performs, for example, priority control 1 and priority control 2 according to the obtained priority.

Figure 5:
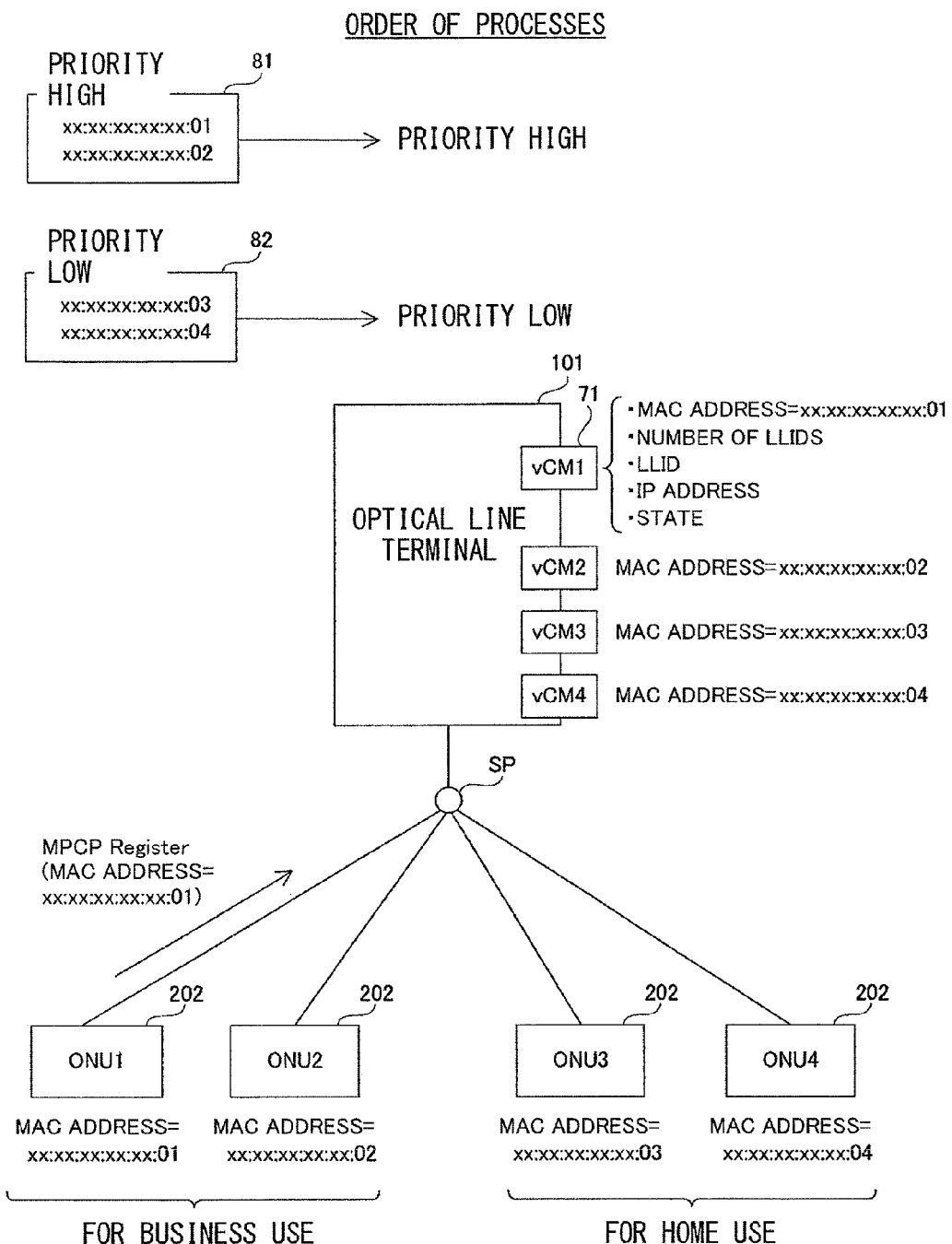
FIG. 5 is a diagram showing another example of a method of determining priorities of ONUs by the optical line terminal according to the embodiment of the present invention.

FIG. 5 is a diagram showing another example of a method of determining priorities of ONUs by the optical line terminal according to the embodiment of the present invention.

The optical line terminal 101 can determine a priority of an ONU 202 from a MAC address in a vCM 71.

Specifically, referring to FIG. 5, the optical line terminal 101 holds priority tables 81 and 82 in the memory unit 13.

In the priority table 81 are registered MAC addresses of ONUs 202 with high priorities. In the priority table 82 are registered MAC addresses of ONUs 202 with low priorities.

In this example, MAC addresses of an ONU1 and an ONU2 which are two ONUs 202 for business use are "xx:xx:xx:xx:xx:01" and "xx:xx:xx:xx:xx:02", respectively, and MAC addresses of an ONU3 and an ONU4 which are two ONUs 202 for home use are "xx:xx:xx:xx:xx:03" and "xx:xx:xx:xx:xx:04", respectively.

Then, in a vCM1 for the ONU1 is registered "xx:xx:xx:xx:xx:01" which is the MAC address of the ONU1, in a vCM2 for the ONU2 is registered "xx:xx:xx:xx:xx:02" which is the MAC address of the ONU2, in a vCM3 for the ONU3 is registered "xx:xx:xx:xx:xx:03" which is the MAC address of the ONU3, and in a vCM4 for the ONU4 is registered "xx:xx:xx:xx:xx:04" which is the MAC address of the ONU4.

In addition, in the priority table 81 are registered the MAC addresses of the ONUs 202 for business use, and in the priority table 82 are registered the MAC addresses of the ONUs 202 for home use.

The optical line terminal 101 obtains a priority of an ONU 202 from a MAC address in a corresponding vCM 71 by referring to the priority tables 81 and 82. The optical line terminal 101 performs, for example, priority control 2 according to the obtained priority.

FIG. 6 is a diagram showing still another example of a method of determining priorities of ONUs by the optical line terminal according to the embodiment of the present invention.

The optical line terminal 101 can determine a priority of an ONU 202 from a configuration file 76 obtained from the management server 151.

Specifically, referring to FIG. 6, in vCMs for an ONU1 and an ONU2 which are two ONUs 202 for business use are registered, as MAC addresses, "xx:xx:xx:xx:xx:01" and "xx:xx:xx:xx:xx:02", respectively, and in vCMs for an ONU3 and an ONU4 which are two ONUs 202 for home use are registered, as MAC addresses, "xx:xx:xx:xx:xx:03" and "xx:xx:xx:xx:xx:04", respectively.

The management server 151 holds, for example, configuration files A and B which are two configuration files 76. The configuration file A is associated with the MAC address "xx:xx:xx:xx:xx:01" and the MAC address "xx:xx:xx:xx:xx:02", and the configuration file B is associated with the MAC address "xx:xx:xx:xx:xx:03" and the MAC address "xx:xx:xx:xx:xx:04".

In the configuration file A, the maximum bandwidth is 1000 Mbps, the minimum guaranteed bandwidth is 10 Mbps, the priority is 5, and the service class is gold. In the configuration file B, the maximum bandwidth is 100 Mbps, the minimum guaranteed bandwidth is 1 Mbps, the priority is 3, and the service class is silver.

When the optical line terminal 101 obtains a configuration file 76 for an ONU 202, the optical line terminal 101 notifies the management server 151 of a MAC address registered in a vCM1 for the ONU 202.

The management server 151 determines, from the MAC address notified by the optical line terminal 101, whether to pass the configuration file A to the optical line terminal 101 or pass the configuration file B to the optical line terminal 101. Specifically, the management server 151 transmits a configuration file 76 associated with the MAC address that is notified by the optical line terminal 101 to the optical line terminal 101.

The optical line terminal 101 determines a priority of the ONU 202 by referring to the configuration file 76 received from the management server 151. For example, the optical line terminal 101 determines a priority of the ONU 202 based only on the maximum bandwidth, only on the minimum guaranteed bandwidth, only on the priority, or only on the service class in the configuration file 76. Alternatively, for example, the optical line terminal 101 determines a priority of the ONU 202 based on a combination of some or all of those pieces of information in the configuration file 76. The optical line terminal 101 performs, for example, priority control 2 according to the obtained priority.

[Operation]

Next, the operation of an optical signal relay apparatus in an optical communication system according to the embodiment of the present invention will be described.

Each apparatus in the PON system 301 includes a computer, and a computation processor such as a CPU in the computer reads a program including some or all of steps of the following sequence from a memory which is not shown, and executes the program. Each of the programs for the plurality of apparatuses can be installed from an external source. Each of the programs for the plurality of apparatuses is distributed stored in a recording medium.

FIG. 7 is a diagram showing an example of a sequence from when an ONU links up until communication traffic starts flowing in the PON system according to the embodiment of the present invention.

Referring to FIG. 7, first, the optical line terminal 101 transmits a DISCOVERY GATE to a PON line (step S1).

Then, the ONU 202 receives the DISCOVERY GATE from the optical line terminal 101 and transmits a REGISTER REQUEST to the optical line terminal 101 (step S2).

Then, when the optical line terminal 101 receives the REGISTER REQUEST from the ONU 202 during a period specified by the DISCOVERY GATE, specifically, a discovery window, the optical line terminal 101 transmits a REGISTER to the ONU 202 (step S3).

Then, the ONU 202 receives the REGISTER from the optical line terminal 101 and transmits a REGISTER ACK to the optical line terminal 101 (step S4).

Then, by performing transmission and reception of various types of information between the ONU 202 and the optical line terminal 101, an OAM link-up process is performed (step S5).

Operation performed when processes such as those described above are performed for a plurality of ONUs 202 at the same timing will be described below.

The optical line terminal 101 then starts priority control 1. Specifically, the optical line terminal 101 determines a priority of each of the linked-up ONUs 202 (step S6).

Then, the optical line terminal 101 creates vCMs according to the priority of each ONU 202 (step S7), and obtains IP addresses and configuration files 76. Note that the optical line terminal 101 may be configured to start priority control 1 after creating vCMs.

More specifically, the optical line terminal 101 transmits a DHCP DISCOVER to the management sever 151 (step S8).

Then, the management server 151 receives the DHCP DISCOVER from the optical line terminal 101 and transmits a DHCP OFFER (step S9).

Then, the optical line terminal 101 receives the DHCP OFFER from the management server 151 and transmits a DHCP REQUEST to the management server 151. The DHCP REQUEST includes, for example, MAC addresses of the ONUs 202 (step S10).

Then, the management server 151 receives the DHCP REQUEST from the optical line terminal 101 and transmits a DHCP ACK (step S11).

Then, the optical line terminal 101 obtains, for example, IP addresses provided to the ONUs 202, an IP address of a TFTP server, and file names of configuration files 76 from the DHCP ACK received from the management server 151 (step S12).

Then, the optical line terminal 101 and the management server 151 perform TFTP processes, i.e., transfer processes of the configuration files 76 according to TFTP (step S13).

Then, the optical line terminal 101 analyzes the configuration files 76 received from the management server 151 (step S14).

Then, the optical line terminal 101 starts priority control 2. Specifically, the optical line terminal 101 determines priorities of the corresponding ONUs 202 based on the results of the analysis of the configuration files 76 (step S15).

Note that the optical line terminal 101 is not limited to being configured to determine priorities from configuration information of the ONUs 202 in the configuration files 76, and as described above, the optical line terminal 101 may determine priorities from MAC addresses of the ONUs 202.

Then, the optical line terminal 101 performs a configuration process for each ONU 202 according to the priority of each ONU 202. More specifically, a configuration process for an ONU 202 is performed by transmission of an extended OAM message to the ONU 202 from the optical line terminal 101 (step S16), transmission of an ACK to the optical line terminal 101 from the ONU 202 (step S17), and the like.

Here, the number of ONUs 202 whose obtaining processes and configuration processes can be performed in parallel by the optical line terminal 101 is smaller than the number of ONUs 202 whose connection processes can be performed in parallel by the optical line terminal 101.

More specifically, during a period P1 during which link-up processes for ONUs 202 are performed, for example, the processes for several thousands of ONUs 202 can be performed in parallel, and the time required for the process per ONU 202 is short.

On the other hand, for a period P2 during which obtaining processes of configuration files 76 for ONUs 202 are performed, for example, the number of ONUs 202 that can be processed in parallel is limited to several tens of ONUs 202 and the time required for the process per ONU 202 is long. In addition, for a period P3 during which configuration processes for ONUs 202 are performed, too, the number of ONUs 202 that can be processed in parallel is small and the time required for the process per ONU 202 is long.

In the PON system 301, by performing priority control 1, for ONUs 202 with high priorities, waiting caused by obtaining processes of configuration files 76 for ONUs 202 with low priorities can be eliminated, and thus, delay before starting configuration processes for the ONUs 202 can be significantly improved. In addition, by performing priority control 2, after performing obtaining processes of configuration files 76 for a plurality of ONUs 202 in parallel, for ONUs 202 with high priorities, waiting caused by configuration processes for ONUs 202 with low priorities can be eliminated, and thus, delay before starting communication can be significantly improved.

As such, the PON system 301 can significantly improve delay before starting the use of communication services by users of ONUs 202.

Meanwhile, in an optical communication system where pieces of configuration information used by ONUs for communication, etc., are saved in a management server, etc., which is different than an optical line terminal, the optical line terminal needs to obtain configuration information for an ONU from the management server using TFTP, etc., and then provide the configuration information to the ONU using extended OAM, etc. Hence, the length of time from when an ONU links up until communication traffic actually starts flowing between the optical line terminal and the ONU becomes long. In addition, if the number of ONUs that link up at the same timing increases, then the length of time further becomes longer, and accordingly, it becomes difficult to satisfy users' demands for an early start of communication.

In the optical line terminal according to the embodiment of the present invention, on the other hand, the obtaining unit 11 performs an obtaining process that obtains configuration information for an ONU 202 from the management server 151. The configuring unit 12 performs a configuration process that transmits a part or all of the configuration information obtained by the obtaining unit 11 to the ONU 202. Then, the obtaining unit 11 performs an obtaining process for each ONU 202 in an order determined according to a priority of each ONU 202.

By such a configuration, a time-consuming obtaining process of configuration information for an ONU 202 from the management server 151 can be performed in an order determined according to the priority of each ONU 202. By this, even when a large number of ONUs 202 link up at the same timing, delay in the start of use of communication services by users of ONUs 202 with high priorities can be suppressed, enabling to satisfy users' demands for an early start of communication.

Therefore, the optical line terminal according to the embodiment of the present invention can provide communication services that appropriately satisfy demands for an early start of communication in an optical communication system where the optical line terminal and a plurality of optical network units can communicate with each other.

In addition, in the optical line terminal according to the embodiment of the present invention, the configuring unit 12 performs the above-described configuration process for each ONU 202 in an order determined according to the priority of each ONU 202.

By such a configuration, a time-consuming transmission process of configuration information from the optical line terminal 101 to an ONU 202 can be performed in an order determined according to the priority of each ONU 202. By this, even when a large number of ONUs 202 link up at the same timing, delay in the start of use of communication services by users of ONUs 202 with high priorities can be further suppressed, enabling to more securely satisfy users' demands for an early start of communication.

In addition, in the optical line terminal according to the embodiment of the present invention, the connection processing unit 14 performs a connection process for establishing a communication connection between an ONU 202 and the optical line terminal 101. The obtaining unit 11 performs an obtaining process for the ONU 202 whose connection process is completed. Then, the number of ONUs 202 whose obtaining processes can be performed in parallel by the optical line terminal 101 is smaller than the number of ONUs 202 whose connection processes can be performed in parallel by the optical line terminal 101.

By such a configuration, in an optical communication system where, while a large number of ONUs 202 can link up in parallel, processes for allowing users of the ONUs 202 to start the use of communication services, which are performed after the link-up, can only be performed in parallel for a small number of ONUs 202, the start of use of the communication services can be more effectively accelerated.

In addition, in the optical line terminal according to the embodiment of the present invention, the memory unit 13 stores priority information indicating the priority of each ONU 202. Then, the obtaining unit 11 performs, using the priority information, an obtaining process for each ONU 202 in an order determined according to the priority of each ONU 202.

By such a configuration, a priority of each ONU 202 is obtained by a simple configuration and process, and various types of processes can be performed in an order determined according to the priority.

In addition, in the optical line terminal according to the embodiment of the present invention, the configuring unit 12 determines a priority of each ONU 202 based on configuration information, and performs a configuration process for each ONU 202 in an order determined according to the priority.

By such a configuration, priorities can be appropriately set according to a difference in the content of communication services between the ONUs 202, etc.

In addition, in the optical line terminal according to the embodiment of the present invention, the obtaining unit 11 performs an obtaining process that obtains configuration information for an ONU 202 from the management server 151. The configuring unit 12 performs a configuration process that transmits a part or all of the configuration information obtained by the obtaining unit 11 to the ONU 202. Then, the configuring unit 12 performs a configuration process for each ONU 202 in an order determined according to the priority of each ONU 202.

By such a configuration, a time-consuming transmission process of configuration information from the optical line terminal 101 to an ONU 202 can be performed in an order determined according to the priority of each ONU 202. By this, even when a large number of ONUs 202 link up at the same timing, delay in the start of use of communication services by users of ONUs 202 with high priorities can be suppressed, enabling to satisfy users' demands for an early start of communication.

Therefore, the optical line terminal according to the embodiment of the present invention can provide communication services that appropriately satisfy demands for an early start of communication in an optical communication system where the optical line terminal and a plurality of optical network units can communicate with each other.

Note that the PON system according to the embodiment of the present invention is configured such that the optical line terminal 101 performs a determination process of a priority of each ONU 202, an obtaining process of configuration information for the ONU 202 from the management server 151, and a transmission process of the configuration information to the ONU 202; however, the configuration is not limited thereto. Specifically, the configuration may be such that instead of the optical line terminal 101, any other apparatus than the optical line terminal 101 or the ONUs 202 in the PON system 301 performs some or all of these processes. For example, it is also possible that the any other apparatus performs a determination process of a priority of each ONU 202 and notifies the optical line terminal 101 of the priority of each ONU 202.

The above-described embodiment is to be considered in all respects as illustrative and not restrictive. The scope of the present invention is indicated by the claims rather than by the above-described description, and all changes which come within the meaning and range of equivalency of the claims are therefore intended to be embraced therein.

The above-described description includes features additionally noted below.

[Additional Note 1]

An optical line terminal capable of communicating with a plurality of optical network units, the optical line terminal including:

an obtaining unit that performs an obtaining process that obtains configuration information for each of the optical network units from another apparatus; and a configuring unit that performs a configuration process that transmits a part or all of the configuration information obtained by the obtaining unit to the each of the optical network units, wherein the obtaining unit performs the obtaining process for each of the optical network units in an order determined according to a priority of the each of the optical network units, and the optical line terminal operates according to DPoE.

[Additional Note 2]

An optical line terminal capable of communicating with a plurality of optical network units, the optical line terminal including:

an obtaining unit that performs an obtaining process that obtains configuration information for each of the optical network units from another apparatus; and a configuring unit that performs a configuration process that transmits a part or all of the configuration information obtained by the obtaining unit to the each of the optical network units, wherein the configuring unit performs the configuration process for the each of the optical network units in an order determined according to a priority of the each of the optical network units, and the optical line terminal operates according to DPoE.

REFERENCE SIGNS LIST

11: OBTAINING UNIT
12: CONFIGURING UNIT
13: MEMORY UNIT
14: CONNECTION PROCESSING UNIT
61 to 64: QUEUE
76: CONFIGURATION FILE
101: OPTICAL LINE TERMINAL
151: MANAGEMENT SERVER
202: ONU
301: PON SYSTEM
SP: SPLITTER

The invention claimed is:

1. An optical line terminal capable of communicating with a plurality of optical network units, the optical line terminal comprising:

an obtaining unit that performs an obtaining process that obtains configuration information for each of the optical network units from another apparatus; and a configuring unit that performs a configuration process that transmits a part or all of the configuration information obtained by the obtaining unit to the each of the optical network units, wherein the obtaining unit performs the obtaining process for each of the optical network units in an order determined according to a priority of the each of the optical network units, the optical line terminal further comprising a connection processing unit that performs a connection process for establishing a communication connection between each of the optical network units and the optical line terminal, wherein the obtaining unit performs the obtaining process for the each of the optical network units whose connection process is completed, and a number of the optical network units whose obtaining processes can be performed in parallel by the optical line terminal is smaller than a number of the optical network units whose connection processes can be performed in parallel by the optical line terminal.

2. The optical line terminal according to claim 1, wherein the configuring unit performs the configuration process for the each of the optical network units in an order determined according to the priority of the each of the optical network units.

3. The optical line terminal according to claim 1, further comprising a memory unit that stores priority information indicating the priority of the each of the optical network units, wherein the obtaining unit performs, using the priority information, the obtaining process for the each of the optical network units in an order determined according to the priority of the each of the optical network units.

4. The optical line terminal according to claim 1, wherein the configuring unit determines another priority of each of the optical network units based on the configuration information, and performs the configuration process for the each of the optical network units in an order determined according to the other priority.

5. A communication system including a plurality of optical network units, and an optical line terminal according to claim 1 capable of communicating with the plurality of optical network units.

6. An optical line terminal capable of communicating with a plurality of optical network units, the optical line terminal comprising:

an obtaining unit that performs an obtaining process that obtains configuration information for each of the optical network units from another apparatus; and a configuring unit that performs a configuration process that transmits a part or all of the configuration information obtained by the obtaining unit to the each of the optical network units, wherein the configuring unit performs the configuration process for the each of the optical network units in an order determined according to a priority of the each of the optical network units, the optical line terminal further comprising a connection processing unit that performs a connection process for establishing a communication connection between each of the optical network units and the optical line terminal, wherein the obtaining unit performs the obtaining process for the each of the optical network units whose connection process is completed, and a number of the optical network units whose obtaining processes can be performed in parallel by the optical line terminal is smaller than a number of the optical network units whose connection processes can be performed in parallel by the optical line terminal.

7. A communication system including a plurality of optical network units, and an optical line terminal according to claim 6 capable of communicating with the plurality of optical network units.

8. A non-transitory computer readable storage medium storing a communication control program used by a communication system including an optical line terminal capable of communicating with a plurality of optical network units, the program causing a computer to perform the steps of:

performing a connection process for establishing a communication connection between each of the optical network units and the optical line terminal;

performing an obtaining process that obtains configuration information for each of the optical network units from another apparatus, the obtaining process being for the each of the optical network units whose connection process is completed; and performing a configuration process that transmits a part or all of the obtained configuration information to the each of the optical network units, wherein in the step of performing the obtaining process, the obtaining process for each of the optical network units is performed in an order determined according to a priority of the each of the optical network units, and a number of the optical network units whose obtaining processes can be performed in parallel by the optical line terminal is smaller than a number of the optical network units whose connection processes can be performed in parallel by the optical line terminal.

9. A non-transitory computer readable storage medium storing a communication control program used by a communication system including an optical line terminal capable of communicating with a plurality of optical network units, the program causing a computer to perform the steps of:

performing a connection process for establishing a communication connection between each of the optical network units and the optical line terminal;

performing an obtaining process that obtains configuration information for each of the optical network units from another apparatus, the obtaining process being for the each of the optical network units whose connection process is completed; and performing a configuration process that transmits a part or all of the obtained configuration information to the each of the optical network units, wherein in the step of performing the configuration process, the configuration process for the each of the optical network units is performed in an order determined according to a priority of the each of the optical network units, and a number of the optical network units whose obtaining processes can be performed in parallel by the optical line terminal is smaller than a number of the optical network units whose connection processes can be performed in parallel by the optical line terminal.

* * * * *